Dec. 8, 1953  W. J. MAIRS  2,662,150
CONTINUOUSLY VARIABLE RESISTOR
Filed Jan. 15, 1952  4 Sheets-Sheet 1
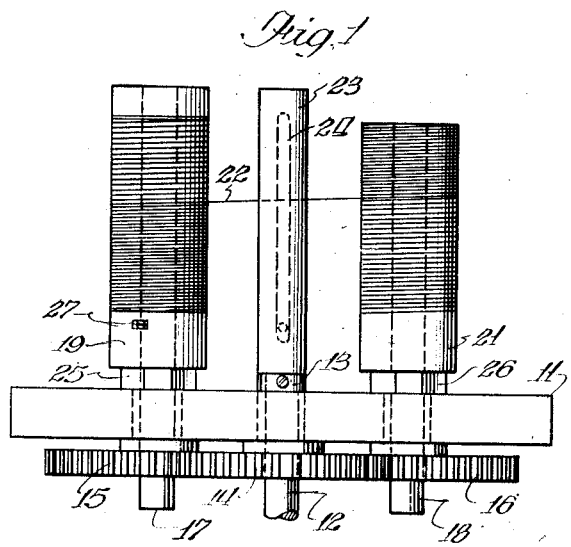
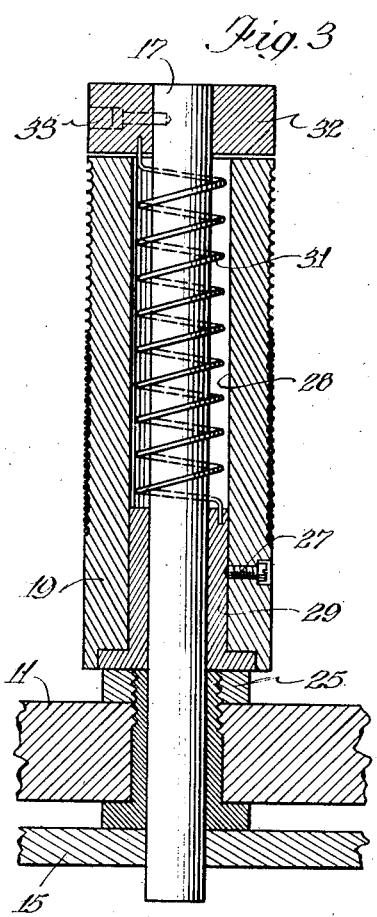
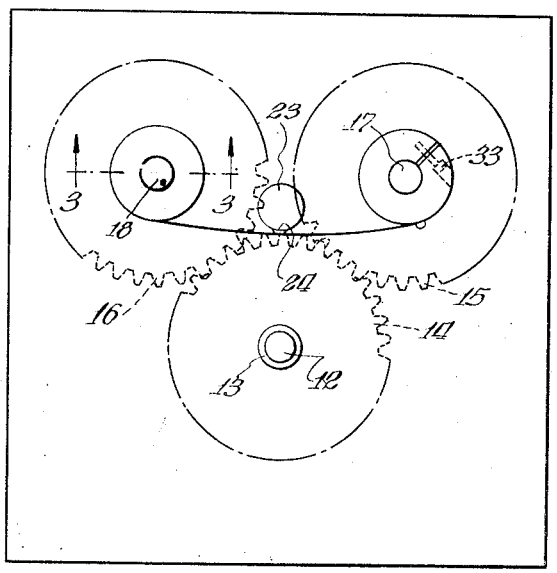
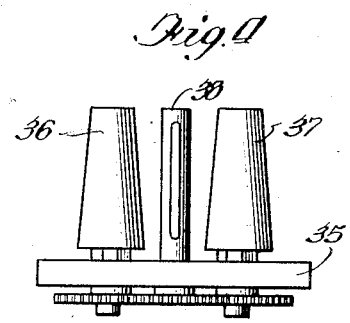
Inventor:
William J. Mairs
By: Alois W. Graf
Attorney Dec. 8, 1953  W. J. MAIRS  2,662,150
CONTINUOUSLY VARIABLE RESISTOR
Filed Jan. 15, 1952  4 Sheets-Sheet 2
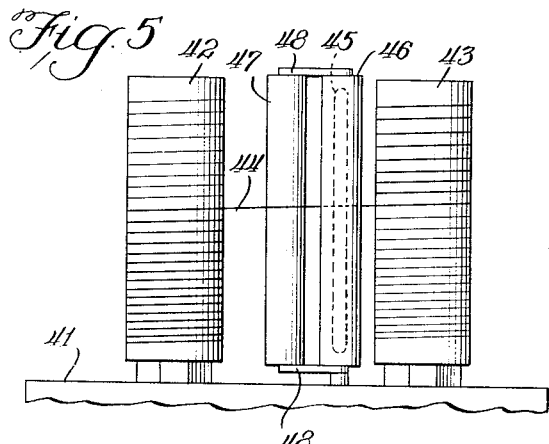
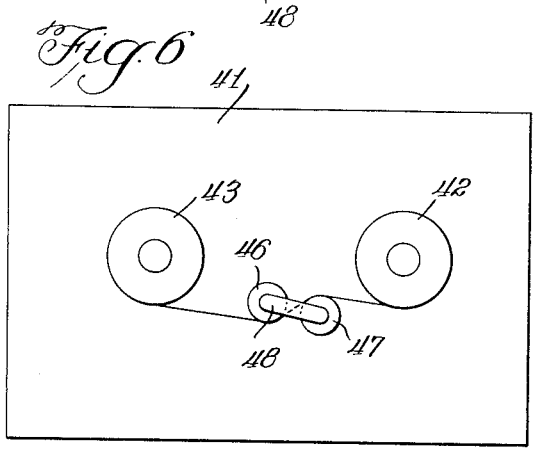
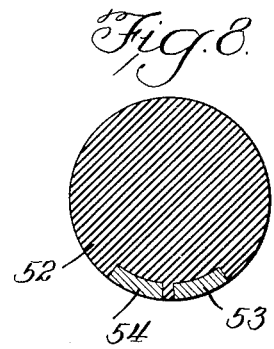
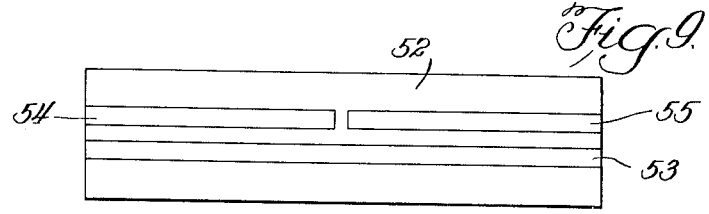
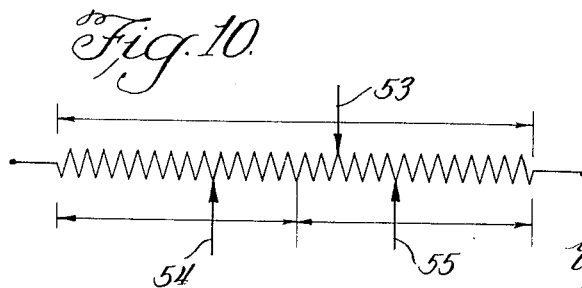
INVENTOR.
William J. Mairs
BY
Alois W. Graf
Atty.

Dec. 8, 1953 W. J. MAIRS 2,662,150
CONTINUOUSLY VARIABLE RESISTOR
Filed Jan. 15, 1952 4 Sheets-Sheet 3

INVENTOR.
William J. Mairs
BY
Alois W. Graf
Att'y.

Dec. 8, 1953 W. J. MAIRS 2,662,150
CONTINUOUSLY VARIABLE RESISTOR
Filed Jan. 15, 1952 4 Sheets-Sheet 4
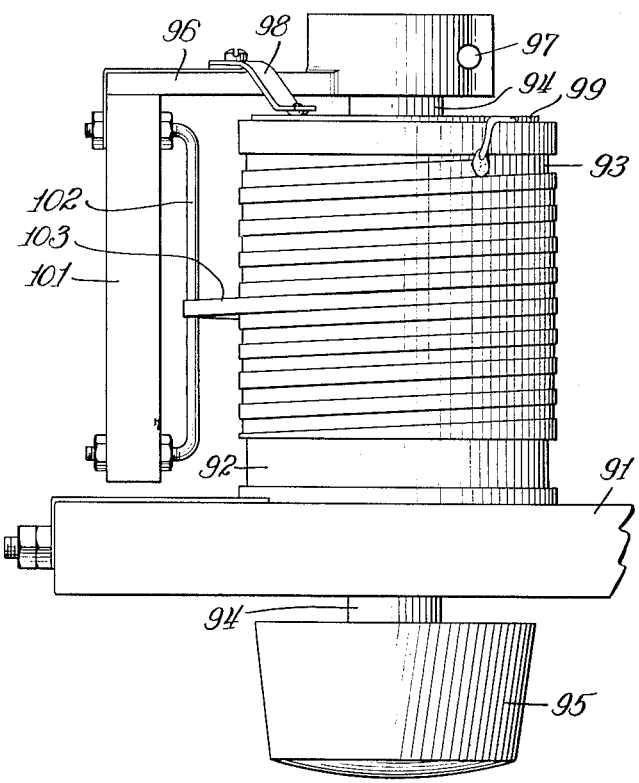
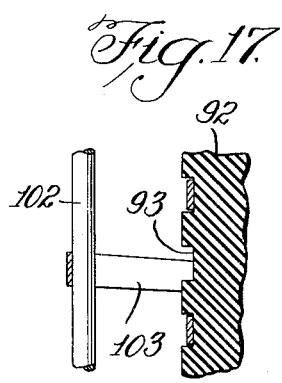
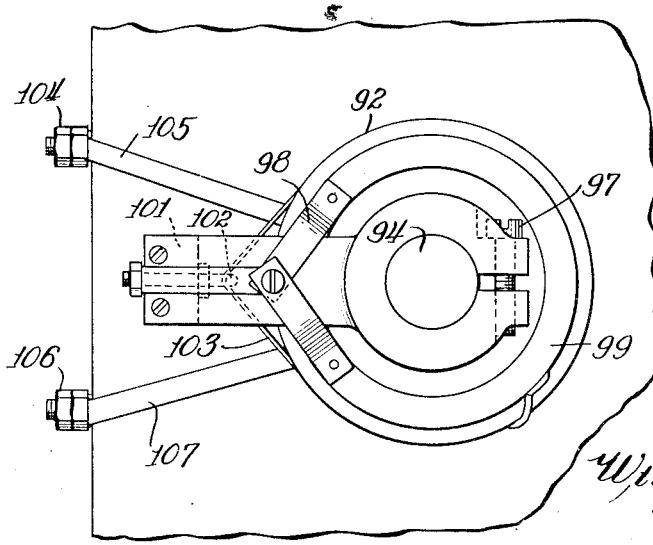
INVENTOR.
William J. Mairs
BY
Alois W. Graf
atty.

Patented Dec. 8, 1953

2,662,150

UNITED STATES PATENT OFFICE 2,662,150

CONTINUOUSLY VARIABLE RESISTOR

William J. Mairs, Waltham, Mass., assignor to Technology Instrument Corporation, Acton, Mass.

Application January 15, 1952, Serial No. 266,530

3 Claims. (Cl. 201—59)

The present invention relates to a continuously variable resistor, and more particularly to a variable resistor having characteristics of the slide wire potentiometer.

This application is a continuation in part of my application for a continuously variable resistor, Serial No. 253,815, filed October 30, 1951, assigned to the same assignee as the present application.

The slide wire potentiometer provides a continuously variable resistor having particular utility in certain applications. A continuously variable resistor of this type is often times needed in a more compact form, and hence there have been provided helically wound resistors having a contact which moves in a helical path to engage the resistance wire. Such arrangements, however, involve certain complex constructions in order to move the contact along the resistance wire without introducing an additional resistance factor due to improper contact along the wire. Such arrangements furthermore are limited to a linear relation between the movement of the actuating control and the resistance element.

In accordance with the present invention it is proposed to obviate certain disadvantages heretofore encountered in the construction of a compact continuously variable resistor of the potentiometer type by holding the contact stationary and moving the resistance wire or flexible resistance element thereacross. Furthermore, an arrangement can be provided for a non-linear change of the contact with respect to the resistance wire for a uniform movement of the actuating control.

Therefore, it is an object of the present invention to provide a new and improved compact continuously variable resistor of the potentiometer type.

Another object of the invention is to provide an improved compact continuously variable resistor wherein the adjustable wire contact is held stationary.

Still another object of the invention is to provide an improved compact continuously variable resistor wherein the flexible resistance element or wire is unwound from and wound on to a round support and the wire passes over a contact bar.

Other and further objects of the present invention subsequently will become apparent by reference to the present description taken in conjunction with the drawings wherein:

Figure 1 is a top view of a continuously variable resistor embodying the principles of the present invention;

Figure 2 is a rear view of the device as shown in Figure 1;

Figure 3 is a cross sectional view of one portion of the device as shown in Figure 1;

Figure 4 is a top view of a device similar to Figure 1 wherein a non-linear relationship is obtained;

Figure 5 is a plan view of a modified construction of a device similar to that shown in Figure 1;

Figure 6 is an end view of the device shown in Figure 5;

Figure 7 is a partial cross sectional view of one form of a flexible resistance element which might be used in the present invention;

Figure 8 is a cross sectional view of another embodiment of a contact bar;

Figure 9 is a plan view of the contact bar shown in Figure 8;

Figure 10 is an electric circuit diagram illustrating the use of the bar shown in Figure 9;

Figure 15 is a plan view of a still further embodiment of the invention;

Figure 16 is an end view of the embodiment shown in Figure 15; and

Figure 17 is a partial view showing certain details of the device of Figure 15.

Figure 11:
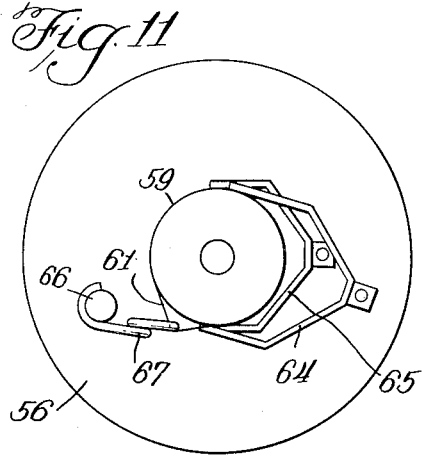
Figure 11 is an end view of another embodiment of the present invention.

Referring to Figures 1 and 2 of the drawing there will be seen a supporting panel 11 which carries a control shaft 12 passing through a suitable bushing and having a locking collar 13 at its end. The control shaft 12 carries a gear 14 at the front of the supporting panel 11 which is engaged by two other gears 15 and 16 mounted on shafts 17 and 18. The shaft 17 carries a grooved insulated reel 19 and a similar grooved reel 21 is mounted on the shaft 18. A flexible resistance element or wire 22 is wound in the grooves of the two insulated reels 19 and 21. The resistance element or wire 22 is wound on to one of the reels and off from the other reel. The resistance element or wire 22 in moving from one reel to another engages an electric contact strip carried by a support rod 23.

The shafts 17 and 18 are mounted in suitable bushings carried by the panel 11 and held in position by lock nuts 25 and 26 respectively.

In order that the resistance element or wire 22 will be in proper contact with the stationary contact strip 24, the insulated reel 19 may have a construction such as that illustrated in detail in Figure 3. It will be noted that the reel 19 has an internal bore 28 which engages a sleeve 29. The reel will be retained or locked in position on the sleeve 29 by a set screw 27 which also serves as an electric terminal for one end of the resistance element or wire 22. The other end of the resistance element or wire 22 may be connected directly to the shaft 18.

A helical spring 21 interconnects the shaft 29 with a collar 31 affixed to the end of the shaft 19 by a suitable clamping screw 33 as may be seen for figure 32. The spring 33 is so arranged as to provide a biassing force between the shaft 17 and the reel 19 so that the resistance element or wire 22 is always subjected to a certain degree of tension. There is an arrangement provided for maintaining good electric contact between the stationary contact 24 and the resistance element or wire 22 irrespective to slight irregularities in manufacture of the two insulated reels 19 and 21 or any lost motion and backlash between the gears 14, 15 and 16.

In the event that a non-linear relationship is desired between the movement of the control shaft and the movement of the wire across the stationary contact an arrangement similar to that shown in Figure 4 may be employed. A panel 35 carries on suitable shafts frusto-conical reels 36 and 37 on which grooves are provided for a flexible resistance element or wire which engages the stationary contact carried between support rod 38. It is believed that it now will be apparent to those skilled in the art that other configurations may be provided for the rotatable insulator members 36 and 37 so that a desired non-linear relation can be obtained.

Figures 5 and 6 show another embodiment of the invention. A suitable supporting panel 41 carries two round insulated support members 42 and 43 which are similar to the cylindrical support member 21 of Figure 1. In the embodiment illustrated the helical grooves on the supports 42 and 43 are spaced at different distances so that adjacent the panel support 41 the grooves are closer together. This will bring about a certain non-linear action somewhat similar to that contemplated in the construction illustrated in Figure 4. The wire or resistance element 44 passes over a contact bar 45 which corresponds generally to the contact bar 24 of Figure 1. In order that the wire 44 be assured of making proper electrical contact with the conductive strip or bar 45 carried by the support 46 an idler roller 47 is provided which is suitably spring biased by means within the support arms 48. Thus it will be appreciated that a certain degree of tension is imparted to the resistance element or wire 44 to assure proper contact with the conductive strip 45.

While in most cases a continuously variable resistor of the type contemplated would employ a resistance element in the form of a single wire it is contemplated to be within the scope of the present invention to employ other flexible resistance elements. One form of such element is shown in Figure 7 wherein there is provided an insulated core 49 about which is wound a helix of a resistance wire 51. Such wire 51 would be coated with suitable insulation which is partially removed to provide good electrical contact with the conductive strips 45 of Figure 5 and 24 of Figure 1.

For certain applications it is also contemplated to employ in place of the single conductive strip shown in Figures 1 and 5 a construction similar to that shown in Figures 8 and 9. Therein is illustrated a support piece or rod 52 which carries a conductive strip 53 extending the entire length of the rod 52. It also carries additional conductive strips 54 and 55. The strip 53, therefore, produces an electrical result which is illustrated in the circuit diagram of Figure 10 wherein the adjustable contact 53 corresponds to the strip 53 of Figure 9. The other two strips 54 and 55 illustrate the effects of the conductive strips 54 and 55. Thus it will be appreciated that the present invention is applicable to such circuit arrangements requiring more than one adjustable or variable contact arm. It, furthermore, is within the scope of the present invention to provide for certain predetermined tap points along the resistance element or wire.

Figure 12:
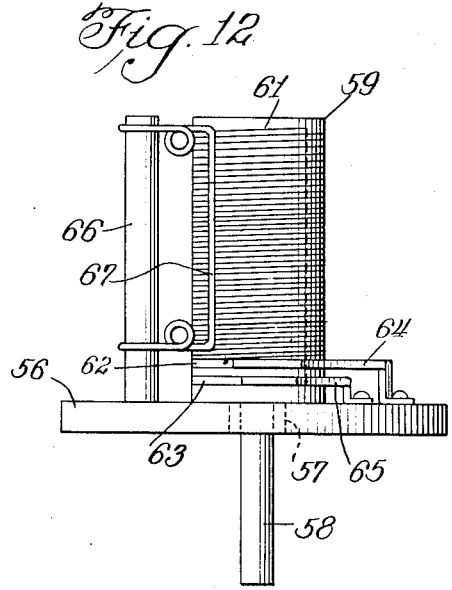
Figure 12 is a plan view of the embodiment shown in Figure 11.

Still another embodiment of the present invention is illustrated in Figures 11 and 12 wherein a suitable support base 56 is provided with a bearing 57 for receiving a shaft 58. The shaft 58 is connected to a round insulated support 59 of suitable configuration which in the present instance has been shown as being cylindrical, although the invention is not to be limited by this illustration. The insulated support 59 carries a flexible resistance element or wire 61. The ends of the wire 61 are electrically connected to two slip rings 62 and 63 which are engaged by contacts or brushes 64 and 65 respectively. Mounted along the cylindrical support 59 is a support post 66 which carries a contact bar 67 over which the resistance element or wire 61 passes. The contact bar 67 may be constructed of spring material so as to provide a resilient biassing force acting against the wire 61 thereby to insure proper electrical contact with the bar 67. As the support 59 is rotated by the shaft 58 the wire 61 is lifted out of its groove to provide the variable contact therewith by means of the bar 67. Thus it will be seen that an effect is produced identical to the arrangement shown in Figure 1 by the use of a single supporting insulator or cylinder 59. The wire, therefore, may be said to be unwound from and wound upon an insulated support as the shaft 58 is rotated.

Figure 13:
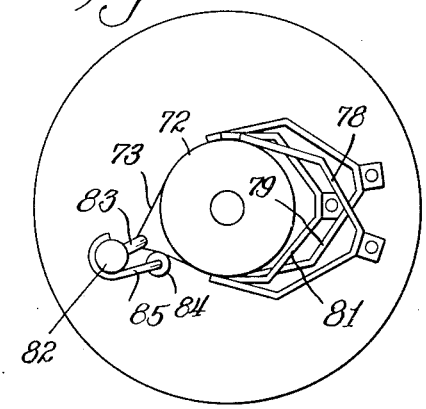
Figure 13 is an end view of still another embodiment of the present invention.

A further modification of the construction shown in Figures 11 and 12 is illustrated in Figure 13. A suitable support disc 68 carries a bearing 69 for a shaft 71 which is secured to the insulated cylindrical support 72. It will be noted that the support 72 has a resistance wire or flexible resistance element 73 wound thereon with convolutions having greater spacing at each end. At a selected intermediate point the insulated cylinder 72 carries a conductive bar 74 which engages the resistance wire element 73. Thus the ends of the resistance wire or element 73 are connected to slip rings 75 and 76 and the conductive bar 74 is connected to a slip ring 77. Suitable contact brushes 78, 79 and 81 respectively engage the slip rings 75, 76 and 77. Arranged parallel to the cylindrical insulated support 72 is a support rod 82 which carries a contact bar or wire 83 over which the wire element 73 passes as it is being unwound from and wound on to the cylindrical support 72 when the shaft 71 is rotated. In order to provide proper tension on the wire element 73 as it passes over the contact bar 83 there may be provided an insulated idler roller 84 held by a suitable spring support 85.

While in the arrangements thus far illustrated it has been convenient to show the more conventional resistance element in the form of a wire it is to be understood that other forms of flexible resistance elements may be employed such as a ribbon or flat wire or an insulator material such as a film carrying a deposited resistance material thereon. An embodiment suitable for use with such resistance element is illustrated in Figures 15, 16 and 17. A suitable panel 91 is provided with an opening thereon for receiving the mounting stud not shown but of conventional construction which is secured to a cylindrical insulated support member 92 having helical grooves 93 along a portion of its outer surface. Within the insulated support 92 there is provided suitable structure for a shaft 94 extending through the panel 91 and being provided with a control knob 95. The shaft 94 at its other end carries an arm 96 which is clamped thereon by a conventional construction employing a clamping screw 97. The arm 96 at an intermediate point carries a pair of brushes 98 which engage a slip ring 99 mounted at one end of the insulated cylindrical support 92.

Depending from the outer extremity of the arm 96 is an insulated bar 101 which carries a contact bar 102 electrically connected to the brushes 98. The bar 102 engages the flexible resistance element 103 which in the present instance is illustrated as being of a ribbon type. In the particular arrangement shown the contact bar 102 acts as a shorting bar to shunt the resistance element from its upper end and which it will be noted is also connected to the slip ring 99. The slip ring 99 is connected to a suitable electrical terminal 104 by a conductor 105. The other end of the resistance element or ribbon 103 is connected to another electrical terminal 106 by a conductor 107.

In the arrangement illustrated in Figures 15, 16 and 17 the insulated cylindrical support 92 having helical grooves thereon is stationary and the bar 102 moves about the cylinder 92. The same relative motion of the resistance element with respect to the bar, however, is obtained as was the case in the preceding embodiments.

Figure 14:
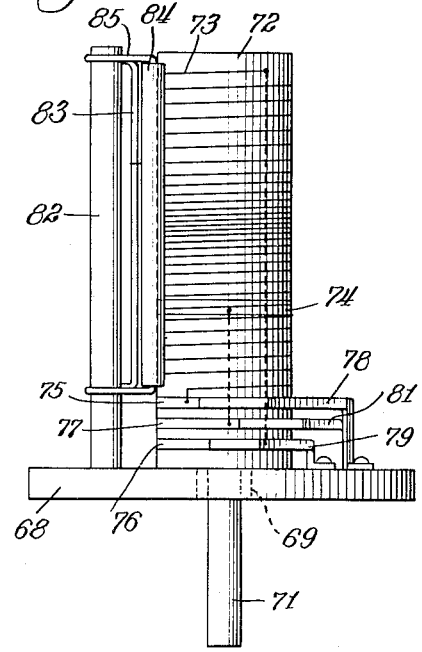
Figure 14 is a plan view of the embodiment shown in Figure 13.

The flexible resistance element or ribbon 103, therefore, is in effect unwound from and wound on to the support element 92 as the shaft 94 is rotated. If desired a suitable idler roller could be mounted on the arm 96 or its depending structure 101 similar to that illustrated in Figures 13 and 14. Thus it will be appreciated that means are provided for imparting motion of the conductor or resistance element relative to a contact with that element.

While for the purpose of illustrating and describing the invention certain embodiments have been illustrated in the drawings it is to be understood that the invention is not to be limited thereby since such variations are contemplated as may be commensurate with the spirit and scope of the invention set forth in the accompanying claims.

I claim as my invention:

1. A variable resistor comprising an insulated grooved round support having a flexible resistance element space wound thereon, a stationary electrical contact extending generally parallel along said round support, said flexible resistance element passing over said contact, means for rotating said support for imparting relative motion between said contact and said element to wind or unwind said resistance element, and means for maintaining substantially constant pressure between said resistance element and said contact, comprising an idler roller positioned parallel to said contact and engaging said resistance element.

2. A continuously variable resistor comprising an elongated flexible resistance element, a generally cylindrical support means for said element arranged to carry said element in spaced convolutions on the exterior thereof so that said element may be wound or unwound from said support, means for making electrical contact with the ends of said element, means for making electrical contact to various intermediate points on said element comprising a conductive bar arranged generally parallel to said support means, one convolution of said resistance element passing over said conductive bar, means for maintaining a predetermined tension on said element as it passes over said bar comprising an insulated spring biased idler roller mounted parallel to and extending the length of said bar, and means for moving said bar relative to said support thereby imparting motion of said resistance element relative to said bar.

3. A continuously variable resistor comprising an elongated flexible resistance element, a pair of round rotatable support members having grooves thereon at varying intervals for receiving said resistance element having one end fastened to one of said support members and the other end fastened to the other of said support members, means for making electrical contact with an intermediate point on said element comprising a conductive bar arranged parallel to said support means, said element passing over said bar as said element extends from one support to another, means for maintaining substantially constant the electrical contact between said bar and said resistance element comprising a spring biased idler roller arranged parallel to and extending the length of said bar, and means for simultaneously rotating said support members.

WILLIAM J. MAIRS.

References Cited in the file of this patent

UNITED STATES PATENTS

| Number | Name | Date |
|---|---|---|
| 420,894 | Thomson | Feb. 4, 1890 |
| 514,325 | Lawrason | Feb. 6, 1894 |
| 1,213,723 | Zeisel | Jan. 23, 1917 |
| 1,918,013 | Bermann | July 11, 1933 |
| 1,977,291 | Scofield | Oct. 16, 1934 |

FOREIGN PATENTS

| Number | Country | Date |
|---|---|---|
| 598,122 | Great Britain | Feb. 11, 1948 |